United States Patent [19]

Berringer et al.

[11] 4,069,102
[45] Jan. 17, 1978

[54] NUCLEAR CORE REGION FASTENER ARRANGEMENT

[75] Inventors: Robert T. Berringer, Gulf Breeze; Octavio J. Machado, Pensacola, both of Fla.

[73] Assignee: Westinghouse Electric Corporation, Pittsburgh, Pa.

[21] Appl. No.: 635,024

[22] Filed: Nov. 25, 1975

[51] Int. Cl.² ............................................. G21C 15/10
[52] U.S. Cl. ...................................... 176/87; 176/38; 285/41; 239/127.3
[58] Field of Search .................... 176/38, 39, 87; 239/127.1, 127.3; 165/177–184; 285/41

[56] References Cited
U.S. PATENT DOCUMENTS

| 808,027 | 12/1905 | Eager | 285/41 |
|---|---|---|---|
| 922,961 | 5/1909 | Schimpff | 285/41 X |
| 1,957,700 | 5/1934 | Dahlstrand | 285/41 |
| 2,127,073 | 8/1938 | Topping | 285/41 |
| 2,999,354 | 9/1961 | Gallo et al. | 239/127.3 |
| 3,357,890 | 12/1967 | Friis et al. | 176/87 X |
| 3,720,581 | 3/1973 | Kaser | 176/87 |
| 3,823,066 | 7/1974 | Thome | 176/50 X |
| 3,868,302 | 2/1975 | Singleton | 176/38 X |

*Primary Examiner*—Peter A. Nelson
*Attorney, Agent, or Firm*—Edward L. Levine; Z. L. Dermer

[57] ABSTRACT

An arrangement for cooling the fasteners affixing a core barrel to a core former and a core baffle to a core former in the reactor vessel internals of a nuclear reactor. The arrangement allows the flowing reactor coolant to contact the fasteners, preferably bolts with an elliptical neck, and maintain lower bolt operating temperatures than previously experienced.

7 Claims, 16 Drawing Figures

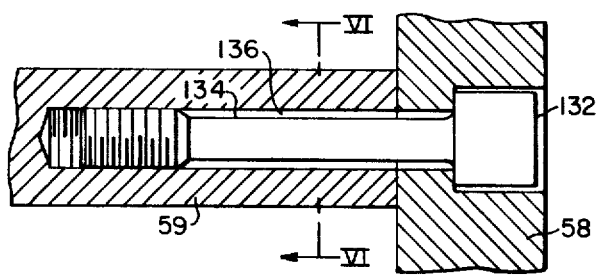 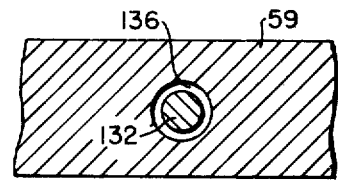
PRIOR ART
FIG. 5
PRIOR ART
FIG. 6
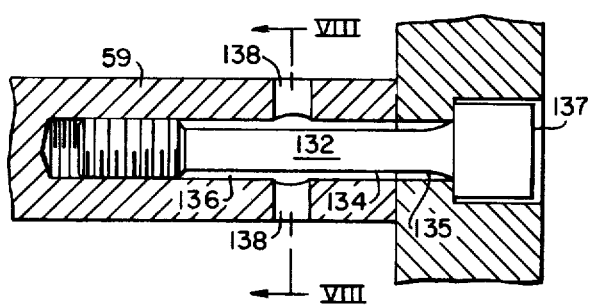 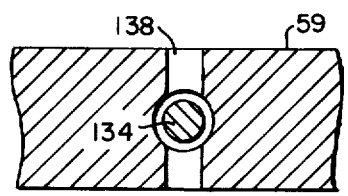
FIG. 7
FIG. 8
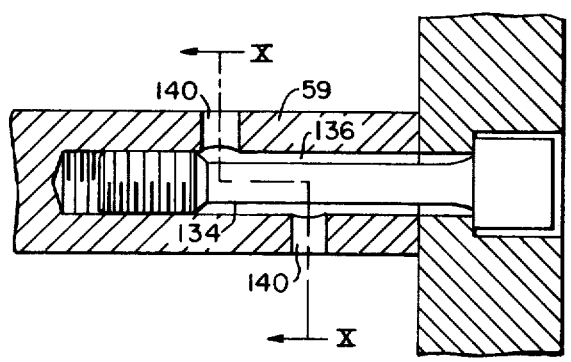 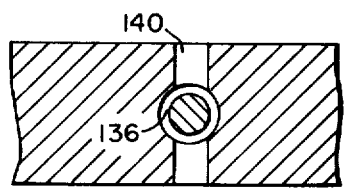
FIG. 9
FIG. 10

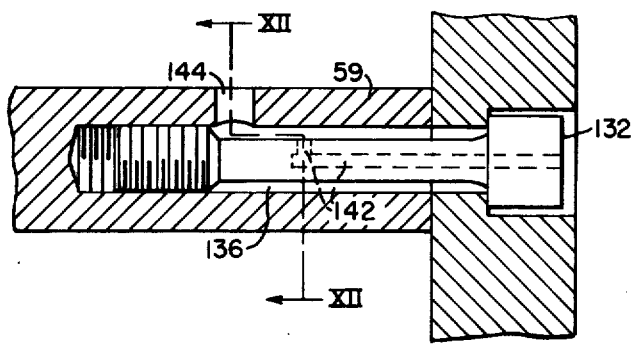
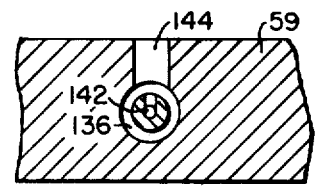
FIG.11  FIG.12
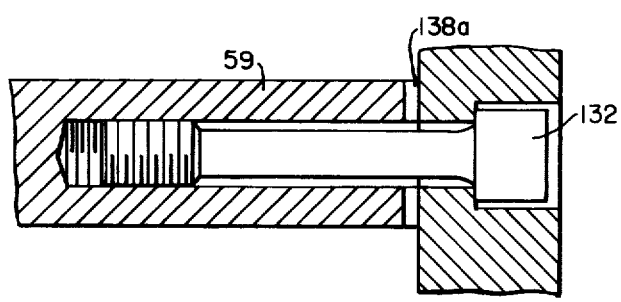
FIG.14
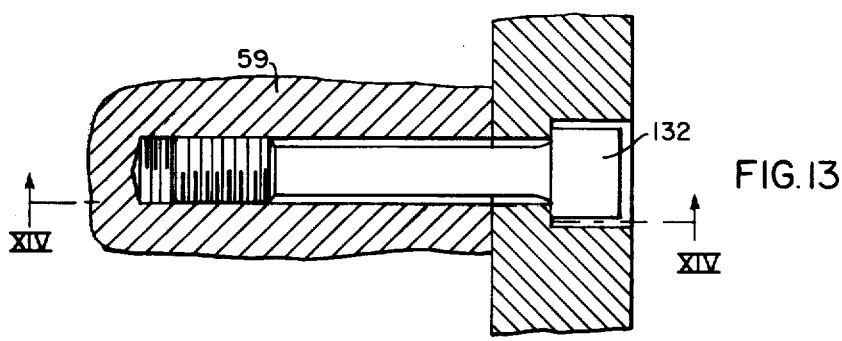
FIG.13
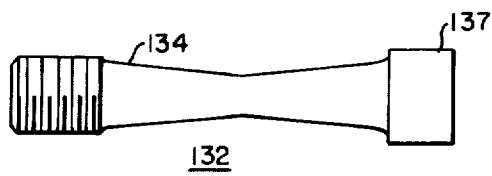
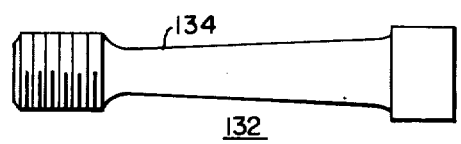
FIG.15  FIG.16

NUCLEAR CORE REGION FASTENER ARRANGEMENT

CROSS-REFERENCES TO RELATED APPLICATIONS

Reference is made to the following applications, assigned to the Westinghouse Electric Corporation and filed concurrently herewith:

1. Application filed in the name of R. T. Berringer and O. J. Machado entitled "Baffle-Former Arrangement For Nuclear Reactor Vessel Internals," Ser. No. 635,025, herein referred to as the Berringer/Machado application. The Berringer/Machado application may be referred to for a better understanding of the functions and operating limitations of a baffling arrangement for a nuclear reactor. This invention may be utilized in conjunction with the inventive teachings of the Berringer/Machado application.

2. Application filed in the name of R. T. Berringer entitled "Nuclear Reactor Core Flow Baffling," Ser. No. 635,026, herein referred to as the Berringer application. The Berringer application may be referred to for a better understanding of flow patterns through and about a nuclear reactor core and lower internals. Although this invention can be utilized in conjunction with the teachings of the Berringer application, the Berringer application eliminates some of the fastener arrangements to which this invention is directed.

3. Application filed in the name of F. W. Cooper et al. entitled "Nuclear Core Baffling Apparatus," Ser. No. 635,023, herein referred to as the Cooper et al. application. The Cooper et al. application may be referred to for a better understanding of baffling arrangements and thermal expansions. This invention may be utilized in conjunction with the inventive teachings of the Cooper et al. application, although that application teaches means to reduce some of the loadings acting upon some of the fastener arrangements to which this invention is directed.

BACKGROUND OF THE INVENTION

1. Field of the Invention

This invention relates to the reactor vessel internals of a nuclear reactor, and more particularly to the means of affixing the component parts of the internals. It provides preferred fasteners and an arrangement to cool the fasteners which experience high operating mechanical loads and temperatures, by utilization of heat transfer to the flowing reactor coolant fluid.

2. Description of the Prior Art

The functions of the reactor internals of a nuclear reactor include support of the core components, such as the fuel assemblies, guidance of reactor coolant flow, and support of core monitoring apparatus. Most of the supported load is transmitted through the wall of the massive core barrel which surrounds the reactor core. Between the core barrel and the core is typically a baffle-and-former arrangement, also supported by the core barrel, which guides coolant flow through the core and provides an annulus that shields the core barrel wall from excessive irradiation. Typically, the baffle plates closely surround the core outer periphery so as to minimize bypass flow, which bypass flow would otherwise lower the thermal efficiency of the reactor. Because of the baffle plates proximity to the core, they experience a high temperature or high heat generation load. This results in a thermal gradient and high mechanical loads in the baffles, formers, core barrel, and the fastening means affixing these components.

Also, the barrel, which must transmit the massive load of the lower internals and fuel assemblies, is a thick structure, typically greater than 2 inches across the barrel wall. The baffle, which is not a similar load supporting structure, is thinner, typically about one inch thick. The formers which support the baffle are typically about 1.4 inch thick, and are affixed to both the baffle, which experiences a relatively high fluid temperature, and the barrel which experiences a relatively low fluid temperature. The actual temperature of these components may also vary during a fuel operating cycle such that the highest temperature component is different at different times in the operating life. The formers and the means which affix the formers to the other components, are therefore subject to a high thermal gradient. Further, the thermal expansion along the length of the relatively thick barrel compared to the thermal expansion of the relatively thin baffle results in a differential expansion that must be accommodated by the means which fasten these components. Over the 30 or 40 year design life of a nuclear plant, the thermal gradients and high mechanical loadings can weaken the fasteners potentially resulting in failure.

The means affixing the formers to the barrel and baffle have typically included a plurality of welds, or, more typically fasteners, such as bolts which are subject to high surface temperatures, which temperatures may rise above the saturation temperature of the coolant at its operating pressure. Some of these bolts penetrate the barrel wall from the outer periphery, and other bolts penetrate the baffle from the interior. From the foregoing discussion, it can be seen that these fasteners are subject to a high thermal load, and are also subject to thermally induced mechanical cyclic stresses. Because of the high mechanical loading, the body or shank of the fasteners is typically surrounded by an annulus within one of the components, such as the former. Early designs of fasteners were rather short bolts with relatively large shank diameters to minimize the thermal concerns. However, due to the large mechanical loadings, longer and thinner fasteners are now typically used. This, however, compounds the thermal concerns, as the fastener annulus is a barrier to heat transfer, resulting in additional heat loading of the fastener. Also, failure of such bolts has typically occurred at the junction of the head to the shank, where a rather abrupt cross-section transition occurs. Further, if coolant leaks into the annulus, it may boil due to the high fastener surface temperature in the annulus, thereby allowing chemical deposits to build up. The deposits will further decrease the heat transfer from the fasteners, resulting in even greater fastener temperatures, and greater potential for failure.

It is, therefore, desirable to provide a fastener and arrangement which will overcome these concerns of the prior art. Such an arrangement should continuously cool the fasteners during operation, so as to minimize induced thermal stresses. It should not allow boiling about the fastener surface. It further should not require excessive amounts of coolant bypass flow which would detract from the overall reactor thermal efficiency. And, it should not require significant modifications in the barrel, baffle, or formers, or add significant processes to the manufacturing of those components.

SUMMARY OF THE INVENTION

This invention provides a fastener and an arrangement which overcomes the deficiencies of the prior art and which is consistent with the above-mentioned desirable features. It utilizes flowing reactor coolant fluid to pass about the fasteners, thereby maintaining a lower temperature on the fastener surfaces than previously achieved. Reactor coolant fluid may also be directed through the fastener, if desired. A larger head to shank transition area may also be utilized on the fastener, to reduce stresses.

As a portion of the shank of the fastener is typically surrounded by an annulus, this invention provides flow channels into, and out of, the annulus, such that coolant enters through an inlet of the channel, flows about the exposed shank surface within the annulus, and exits through the channel outlet. The coolant which enters the channel is desirably drawn from a source of coolant within the reactor vessel which has not passed through the core and consequently is relatively cool. This source may be coolant which has entered the reactor vessel and is flowing along the outer periphery of the core barrel, across the heads of the barrel-to-baffle fasteners, or coolant which is flowing in the annulus between the core barrel and core baffle, thereby bypassing the reactor core.

In the preferred embodiment, the fasteners are bolts with an elliptical transition neck, and the flow channel for each fastener is a circular hole passing through the former at the location of the annulus surrounding the bolt shank. In other embodiments, the flow channel may be offset, specifically inducing flow along the bolt shank within the bolt annulus. The annulus is preferably of a circular cross-section, although other configurations may be utilized. In another embodiment, the flow channel inlet is in the bolt head, such that coolant flows partially through the bolt, into the annulus, and exits at an outlet channel in the former.

Bolts of varying cross-section along the shank may also be utilized to reduce stresses and also assist flow about the shank within the bolt annulus. Utilization of this invention maintains acceptably low fastener operating temperatures and stresses in a nuclear reactor environment and alleviates the potential for fastener failure.

BRIEF DESCRIPTION OF THE DRAWINGS

The functions and advantages provided by the invention will become more apparent from the following description taken in connection with the accompanying drawings, in which:

FIG. 5 is an elevation view, in cross-section, of a prior art fastener connection of reactor internals components;

FIG. 6 is a sectional view taken at VI—VI of FIG. 5;

FIG. 7 is an elevation view, in cross-section, of a preferred embodiment fastener connection of reactor internals components;

FIG. 8 is a sectional view taken at VIII—VIII of FIG. 7;

FIG. 9 is an elevation view, in cross-section, of another preferred embodiment fastener connection;

FIG. 10 is a sectional view taken at X—X of FIG. 9;

FIG. 11 is another elevation view, in cross-section, of a preferred embodiment fastener connection;

FIG. 12 is a sectional view taken at XII—XII of FIG. 11;

FIG. 13 is a plan view, in cross-section, of yet another preferred embodiment fastener connection;

FIG. 14 is a sectional view taken at XIV—XIV of FIG. 13;

FIG. 15 is a view of a fastener consistent with this invention; and

FIG. 16 is a view of another fastener consistent with this invention.

DESCRIPTION OF THE PREFERRED EMBODIMENTS

Figure 1:
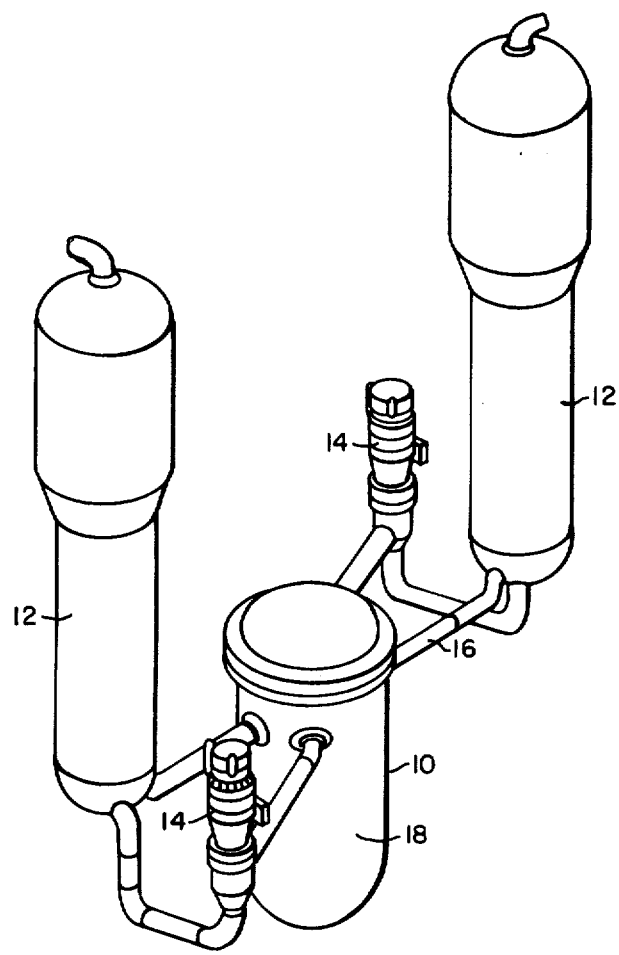
FIG. 1 is an isometric schematic of primary coolant system of a nuclear reactor.

Referring to FIG. 1, there is shown a typical arrangement of a primary reactor coolant system for a liquid cooled nuclear reactor. The major components shown include a reactor vessel 10, steam generators 12, reactor coolant pumps 14, and main coolant piping 16 connecting the components in the manner shown. A typical reactor coolant system includes a single reactor vessel 10, and a plurality of flow loops, each loop including a pump 14 and a steam generator 12. The system shown includes two loops, although other numbers of loops are also typical, and coolant flow is generally from the reactor vessel 10, to the steam generator 12, to the pump 14, and returned to the vessel 10. Housed within the reactor vessel 10 are the reactor internals and the nuclear core 18. The coolant absorbs heat energy as it passes through the core 18, and transfers the energy at the steam generator 12 to fluid in other systems which fluid is typically vaporized to drive turbine-generator apparatus.

Figure 2:
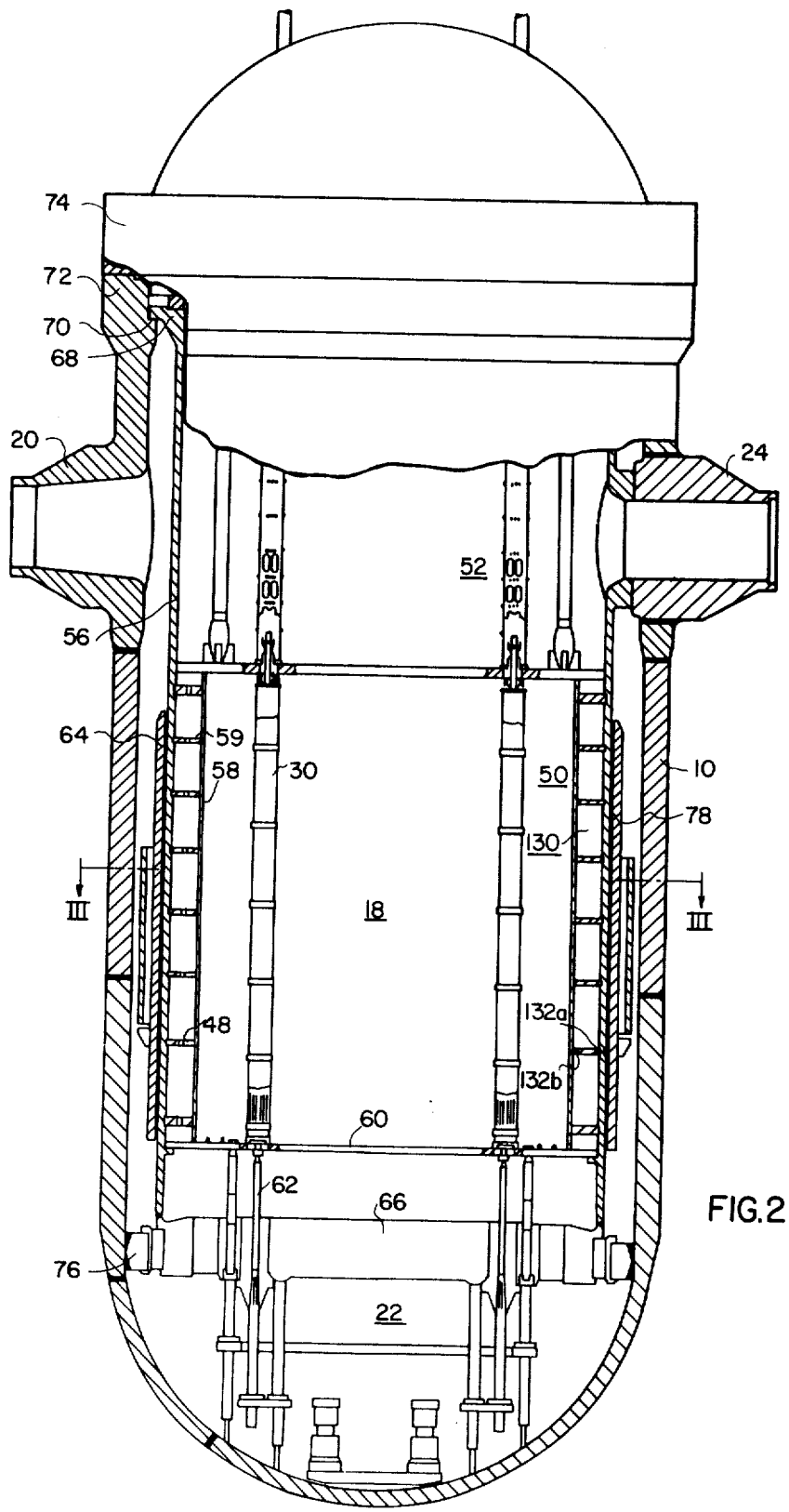
FIG. 2 is an elevation view, in cross-section, of a reactor vessel and the reactor vessel internals, of the reactor of FIG. 1.

The reactor internals and core 18 are shown within the vessel, in FIG. 2. A typical core 18 includes a plurality of elongated fuel assemblies 30, disposed adjacent one another, so as to approach the configuration of a right circular cylinder, shown best in FIG. 3. A typical fuel assembly 30 is shown in FIG. 4, and includes an upper nozzle 32, a lower nozzle 34, and a plurality of elongated, generally cylindrical fuel rods 36 disposed between the nozzles 32, 34. The fuel rods 36 enclose a plurality of stacked fuel pellets 38 of enriched uranium dioxide or other nuclear fuel. The rods 36 are supported laterally by a plurality of fuel grids 40 along the assembly 30 length, which are of an "egg-crate" arrangement so as to allow axial expansion of the rods 36 and minimize any contact among adjacent fuel rods 36. The grids 40 also are the contact points between adjacent assemblies and transmit any lateral loads. Also shown inserted in the assembly 30 is a control rod element 42, which is removably positioned within preselected assemblies 30 of the core 18 to control the fissioning process.

For purposes of description, the components of the reactor internals may be divided into the lower core support structure 50 or lower internals and the upper core support structure 52 or upper internals. The functions of the internals include supporting, aligning, and guiding core components, directing coolant flow to and from the core components, and supporting and guiding in-core instrumentation which provides indications of core conditions. The upper internals 52 support, or provide secondary support, for the top of the core 18, and guide such components as the control rod elements 32. The in-core instrumentation provides an indication of conditions, such as coolant temperature and neutron flux, within the core 18.

The major containment and support member of the internals is the lower internals 50. It includes a core barrel 56, core baffle 58, core formers 59, lower core plate 60 and support columns 62, neutron shields 64, and a bottom support plate 66. The most typical material for construction of this structure is stainless steel. The lower internals is supported at the upper flange 68 of the core barrel 56, which seats on a ledge 70 of the reactor vessel flange 72. The vessel flange 72 also supports the reactor vessel head 74, which is bolted to the reactor vessel 10. The lower end of the lower internals 50 is restrained in lateral movement by a radial support system 76 attached to the vessel wall. The neutron shields 64 are affixed about the outer periphery of the core barrel 56, and function to protect the vessel 10, in the core area, from streaming neutrons. An annular-like space 78 is provided between the neutron shields 64 and the core barrel 56 to allow coolant flow along the barrel 56 exterior. Affixed to and within the core barrel 56 are the core formers 59 which support the vertical baffles 58 and enclose the radial periphery of the core 18. The formers 59 and baffles 58 also provide alternate coolant flow paths to cool the baffles 58, formers 59, and core barrel 56. The lower core plate 60 is also supported by the core barrel 56, and is positioned to support and orient the fuel assemblies 30. The lower core plate 60 is perforated for flow purposes and includes means, such as pins, to properly orient the assemblies 30.

During operation, the main flow of reactor coolant enters the reactor vessel 10 through a plurality of vessel inlet nozzles 20, passes downward about the outer periphery of the core barrel 56 and neutron shields 64, and is then turned 180° in the region below the bottom support plate 66, the lower plenum 22. It then passes upward through openings in the bottom support plate 66 and lower core plate 60, and upwardly through and about the fuel assemblies 30, where it cools the core and absorbs heat energy. It then passes through openings in the upper core plate 92, is turned 90°, and exits through a plurality of vessel outlet nozzles 24, to transfer heat energy at the steam generators 12.

There are also alternate flow paths within the vessel 10 of a much lesser magnitude than the main coolant flow, to cool components other than the fuel assemblies 30, such as the baffle 58, formers 59, and core barrel 56. The formers 59 are therefore provided with flow holes 48 to transmit coolant generally parallel to flow through the core 18. The foregoing description provides a background for proper understanding and application of this invention, which relates primarily to the cooling of those components by alternate flow paths, and the affixing of these components to one another in a manner so as to minimize the effects of thermally induced loadings under both steady state and power level change operation.

Figure 3:
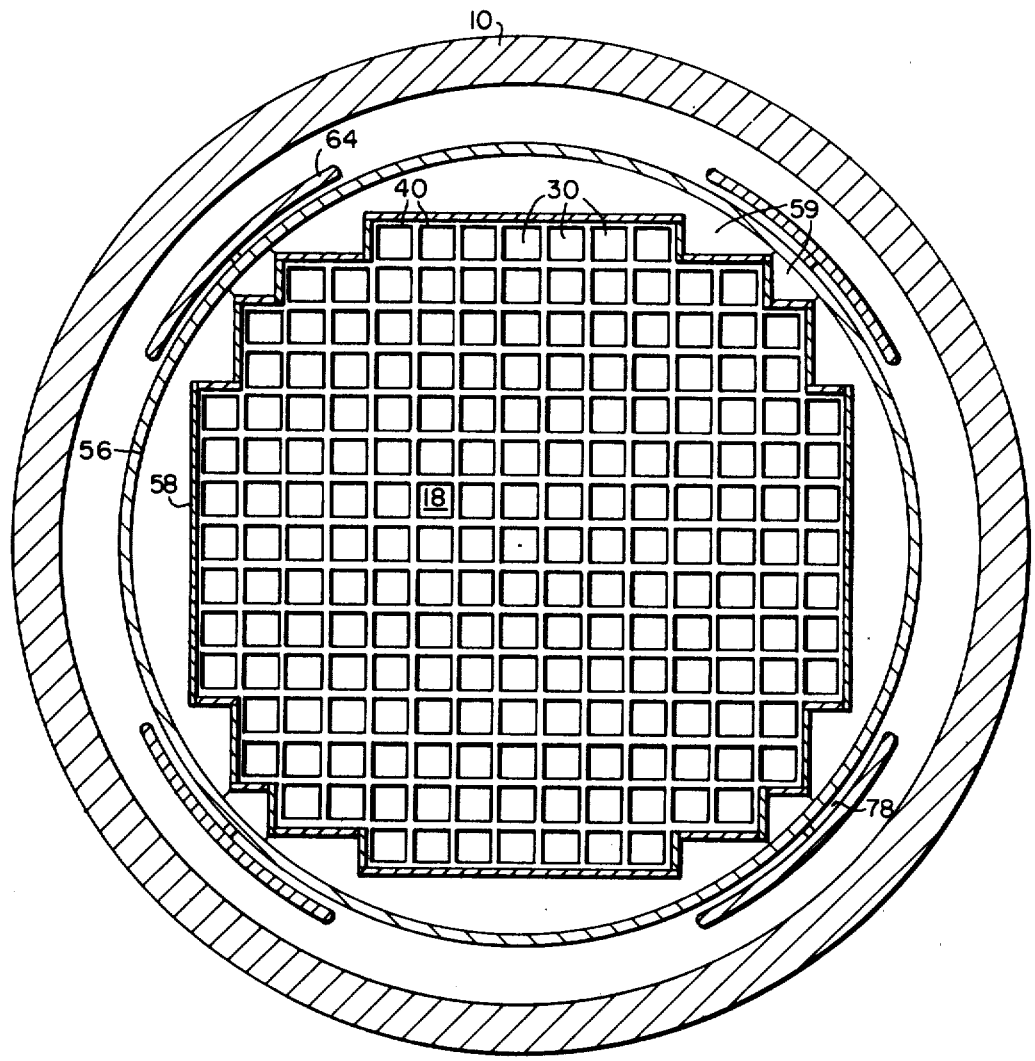
FIG. 3 is a plan view, in cross-section, taken at III—III of FIG. 2.
Figure 4:
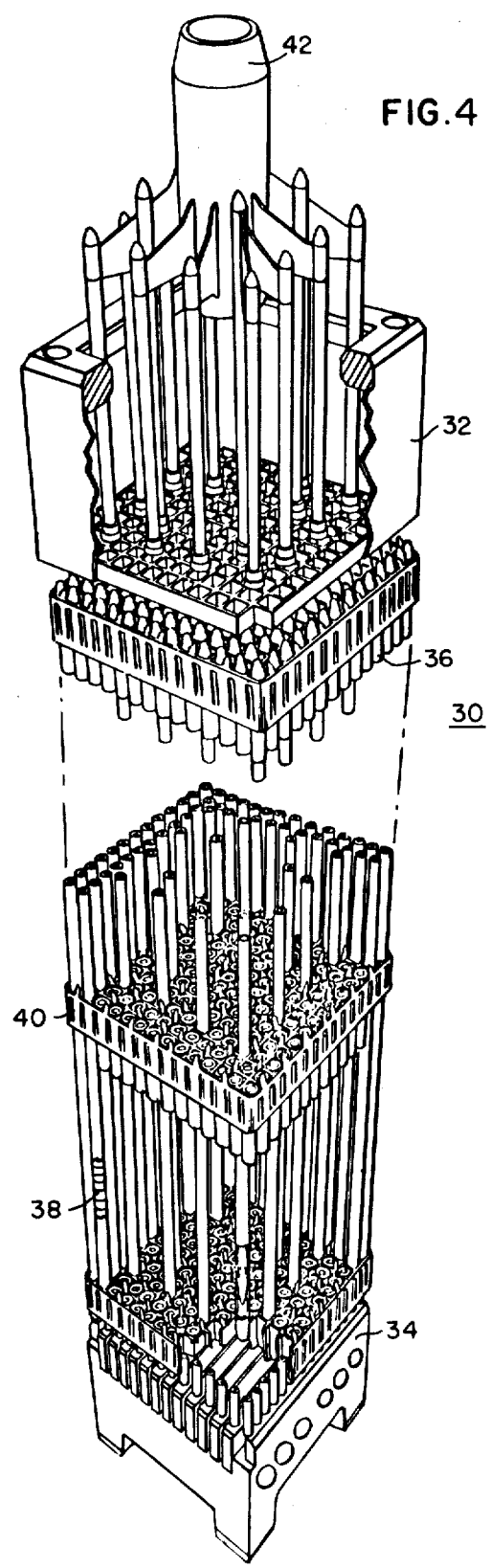
FIG. 4 is an isometric view of a typical nuclear fuel assembly.

As can be seen from FIGS. 2 and 3, the core baffle 58 is located closely adjacent the outermost fuel assemblies 30 of the core 18. As such, it functions, in conjunction with the formers 59, to maintain the main coolant flow upwardly through the core 18 while providing a coolant containing annulus 130 between the core 18 and the core barrel 56. The annulus 130 also functions to protect the core barrel 56 and the vessel 10 from excessive neutron irradiation, which could detrimentally affect the strength of the components. While it is therefore desirable to increase the width of the annulus 130 for irradiation protection, other factors must be considered. Enlarging the annulus 130 would also require enlarging the diameter of the core barrel 56, the vessel 10, and the vessel support structure, which is economically undesirable. Also, the overall thermal efficiency of the reactor would be decreased if a relatively large amount of coolant flow were allowed to bypass the core 18 area, and then mix with the heated coolant exiting the core. It would also be undesirable to have any stagnant areas within this region.

With the arrangement of the core barrel 56, core baffle 58, and core formers 59, as shown in FIG. 2, there is generally a higher temperature fluid adjacent the baffle 58 than there is adjacent the barrel 56, as the baffle 58 is closer to the core 18. Further, the barrel 56, which must transmit the massive load of the lower internals 50 and the fuel assemblies 30, is a thick structure, typically greater than two inches across the barrel wall. The baffle 58, which is not a similar load supporting structure is thinner, typically about 1 inch thick. The formers 59, which support the baffle 58, are typically about 1.4 inches thick, and are affixed to both the baffle 58 and the barrel 56, which experience a thermal expansion differential. The formers 59, and the means which affix the formers 59 to the other components, are therefore subject to a high thermal heat generation and large mechanical loads.

The fastening means affixing the formers 59 to the barrel 56 and baffle 58 have typically included a plurality of welds, or more typically bolts 132, subject to high surface temperatures. Bolts 132a penetrate the barrel 56 wall from the outer periphery, and bolts 132b penetrate the baffle 58 from the interior. From the foregoing discussion, it can be seen that the bolts 132 are subject to a high thermal load, and are subject to thermal cyclic stresses during changes in power level. Further, because of the different thicknesses of the components the bolts affix, the response of these components to changes in temperature with changes in power level are different. The thermal expansion along the length of the relatively thick barrel 56 compared to the thermal expansion of the relatively thin baffle 58, results in a differential expansion that must be accommodated by the bolts 132. Over the thirty to forty year design life of a nuclear plant, these factors can weaken the bolts 132, potentially resulting in failure.

Further, because the bolts 132 operate with high surface temperatures and because of the desirability to optimize bypass flow in the annulus 130, there is a likelihood that boiling could occur on any exposed surfaces of the bolts 132. FIGS. 5 and 6 show a typical bolt 132 connection as utilized in the prior art. Although noted as connecting the baffle 58 to former 59, the figures are also applicable to the connection of the barrel 56 to a former, as is true of the subsequent figures. If boiling were to occur along the bolt surfaces exposed to reactor coolant, it would cause deposits to form on those surfaces which would tend to decrease the heat transfer from the bolts 132, resulting in even greater bolt temperatures, and greater potential for failure. Also, the higher operating temperature of the bolts relative to the components it joins, tends to relax the preload on the bolt.

As shown in FIGS. 5 and 6, a portion of the fastener shank 134 is surrounded by a fastener annulus 136. Although the annulus 136 is typically of a circular cross-section, other geometric configurations may effectively be utilized in conjunction with this invention. Any leakage of coolant into the annulus 136 caused by the loadings as discussed above, would further compound the loadings due to chemical depositions and resulting increased fastener temperatures caused by boiling. These concerns can be alleviated by this invention, a preferred embodiment of which is shown in FIGS. 7 and 8. As there shown, the fastener preferably has a gradual transition neck 135 between the head 137 and the shank 134. An elliptical transition 135 reduces the stress concentration experienced in prior art bolts with only a small rounded transition. The basic principle of flow control with the invention is to provide a flow of coolant to the annulus 136, so as to continuously cool the fastener 132 during reactor operation. This may be done in many fashions, in addition to those which will now be specifically described. It therefore is to be understood that the specific embodiments discussed and shown herein are to be construed in an illustrative, and not limiting sense. It should further be noted that the flow of coolant fluid to the bolt 132 and bolt annulus 136 may be from fluid flowing generally upward or downward about the bolt 132 location. The embodiment shown in FIGS. 7 and 8 includes a flow channel 138 through the former 59, at a location along the shank 134 of the fastener 132. The flow channel 138 shown is circular, although other configurations can also be utilized. The size of the channel necessary for adequate temperature control and circulation will vary dependent upon the temperature and pressure of the coolant flowing through the channel. It should, however, be large enough to maintain a flow of coolant into the annulus 136 that will maintain the fastener 132 surface temperature below the saturation temperature of the coolant at its operating pressure. The channel should also be small enough that the total bypass flow through the baffle-former annulus 130 does not significantly detract from reactor thermal efficiency. For the configuration shown in the Figures typical dimensions include a bolt shank 134 0.5 inch in diameter, an annulus 0.7 inch in diameter, and a flow channel 138 0.4 inch in diameter. The overall length of the typically §-11 UN-R bolts is 3.5 to 2.0 inches. The bolt is typically comprised of such materials as stainless steel or Inconel. Coolant flow enters at one inlet end of the channel 138, passes through the annulus 136 and about the bolt shank 134, and exits at the opposite outlet end of the flow channel.

FIGS. 9 and 10 show another embodiment, wherein a flow channel 140 is offset. This embodiment has the desirable effect of necessarily inducing flow along the shank 134 in the bolt annulus 136. This is specifically desirable with very long fasteners. However, it requires a more complex manufacturing process. It is not necessary to specifically induce flow along the shank 134, as circulating coolant will fill the limited volume of the annulus.

Another embodiment is shown in FIGS. 11 and 12. This embodiment is primarily applicable to the fasteners 132a, about the head of which cooler inlet coolant passes. In this embodiment, flow is passed through a bolt flow inlet channel 142, to the bolt annulus 136, and exits through a flow outlet channel 144 in the former 59. This provides the advantage of directly cooling the interior, as well as the exterior of the bolt 132a, including the interior portion of the bolt head. The embodiment, of course, requires more complex manufacturing processes than the illustrative embodiments previously described. It also inherently weakens the initial strength of a bolt, although it could prove more beneficial over a long bolt lifetime operating in a high temperature differential environment. Coolant flowing through the channel 142 will enter, fill, and circulate in the annulus 136.

Yet another embodiment is shown in FIGS. 13 and 14. It is similar to the embodiment of FIGS. 7 and 8, except the flow channel 138a is positioned nearer the head of the bolt 132, at the edge of the former 59. Forming the channel at the edge of the former may reduce the manufacturing processes involved, since only a notch at the former edge need be made as compared to drilling of a hole through the interior of the former 59.

FIGS. 15 and 16 show alternate fastener configurations that may also be utilized to reduce stresses within the fastener, particularly at the area, or neck, just below the head 137, where the highest moment and shear loadings typically occur. The narrowed portions of the shanks 134 also contribute to better circulation in the fastener annulus 136, and more effective cooling. The various illustrative embodiments of the fasteners and flow channels may be utilized in varying combinations.

It will be apparent from the foregoing description that many modifications and variations are possible in view of the above teachings. For example, multiple flow channels, located at various positions, could be utilized at each bolt location. The fastener annulus could extend horizontally through a component, such as the former. Other geometric configurations to provide a gradual fastener head to shank transition can be utilized. And, other flow channel configurations can be used. Many other variations are also possible. It is therefore to be understood that within the scope of the appended claims, the invention may be practiced other than as specifically described.

We claim:

1. An arrangement utilizing flowing reactor coolant fluid to cool a fastener positioned to affix at least two components located between a core and a pressure vessel of a nuclear reactor, said fastener having a head and a shank, at least a portion of the shank of said fastener surrounded by a fastener annulus within at least one of said components, said arrangement comprising a flow channel having an inlet and an outlet, said inlet and outlet being in fluid communication with said annulus and said flowing coolant.

2. The arrangement of claim 1 wherein said inlet and said outlet are aligned along a common axis.

3. The arrangement of claim 1 wherein said inlet is disposed within said fastener and said flow channel passes axially partially through said fastener.

4. An arrangement for cooling a fastener affixing a core former to a core baffle of a nuclear reactor, said fastener having a head and a shank, said former having a fastener annulus partially therethrough, at least a portion of said shank surrounded by said annulus, said arrangement comprising a flow channel through said former, said channel passing through said former and disposed so as to intersect said annulus, with reactor coolant flowing through said flow channel.

5. An arrangement for cooling a fastener positioned to affix at least two components disposed between a core and a pressure vessel of a nuclear reactor circulating a liquid coolant, at least a portion of said fastener surrounded by a fastener annulus within at least one of said components, said arrangement comprising means to direct flow of said coolant into and out of said fastener annulus, said last named means being oriented and sized to maintain the fluid within said fastener annulus at a temperature less than the saturation temperature of said fluid during operation of said reactor.

6. A reactor internals structure for a nuclear reactor having a reactor vessel and means for circulating a liquid coolant through said vessel, said structure comprising:
   a. a generally cylindrical vertically oriented core barrel supported within said vessel;
   b. a generally vertical core baffle disposed within said barrel so as to form an annulus between said baffle and barrel;
   c. a plurality of generally horizontal former plates disposed at preselected elevations within said annulus;
   d. means for fastening each said former plate to said barrel and to said baffle, said means comprising a fastener having a head and a shank, at least a portion of said shank surrounded by a fastener annulus within said former plate; and
   e. means for cooling said fastener, said cooling means comprising a flow channel in said former plate having an inlet and an outlet, said inlet and outlet being in fluid communication with said fastener annulus and said circulating coolant.

7. A method for cooling a fastener affixing two components disposed between a core and a pressure vessel of a nuclear reactor, one of said components having a hole therein for receiving said fastener, a portion of said hole being enlarged so as to form a fastener annulus about a portion of said received fastener, said vessel having a reactor coolant flowing therethrough and said fastener disposed partially within said annulus, said method comprising directing said flowing coolant into, through, and out of said annulus.

* * * * *